J. A. HEDBERG.
ANIMAL TRAP.
APPLICATION FILED AUG. 6, 1921.

1,423,715.

Patented July 25, 1922.

INVENTOR.
J. A. Hedberg
BY
ATTORNEY.

UNITED STATES PATENT OFFICE.

JOHN A. HEDBERG, OF DENVER, COLORADO, ASSIGNOR TO THE SOUTH SIDE MANUFACTURING COMPANY, OF DENVER, COLORADO, A FIRM COMPOSED OF ELMO E. RIDGLEY AND JOHN A. HEDBERG.

ANIMAL TRAP.

1,423,715. Specification of Letters Patent. Patented July 25, 1922.

Application filed August 6, 1921. Serial No. 490,297.

*To all whom it may concern:*

Be it known that I, JOHN A. HEDBERG, a citizen of the United States, residing at Denver, in the county of Denver and State of Colorado, have invented certain new and useful Improvements in Animal Traps, of which the following is a specification.

This invention relates to animal traps, and its primary object is to provide a trap which is actuated by the weight of the animals entering thereinto and which is adapted to catch the animals in numbers predetermined by an adjustment associated with its operating mechanism.

Another object of the invention is to provide a trap of the above described character which is designed to entrap several animals at one time and in one and the same receptacle by a single operation of a mechanism which, actuated by the aggregate weight of the animals, automatically closes the opening through which they entered.

With the above and other objects in view all of which will fully appear in the course of the following description, my invention consists of the construction and arrangement of parts illustrated in the accompanying drawings in the several views of which like parts are similarly designated and in which—

Figure 2:
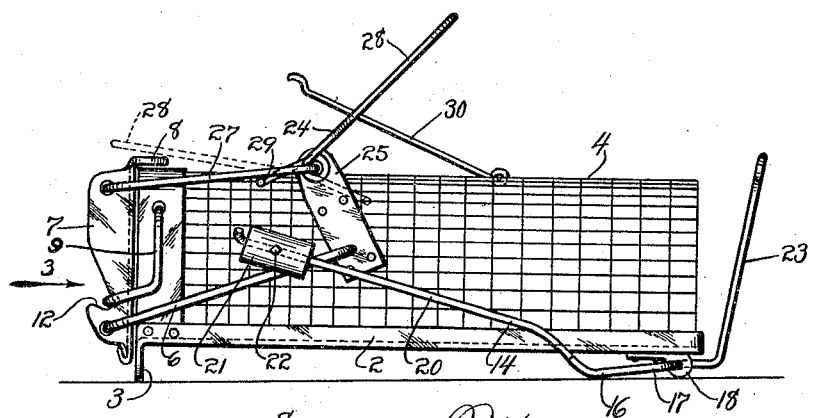
Figure 1:
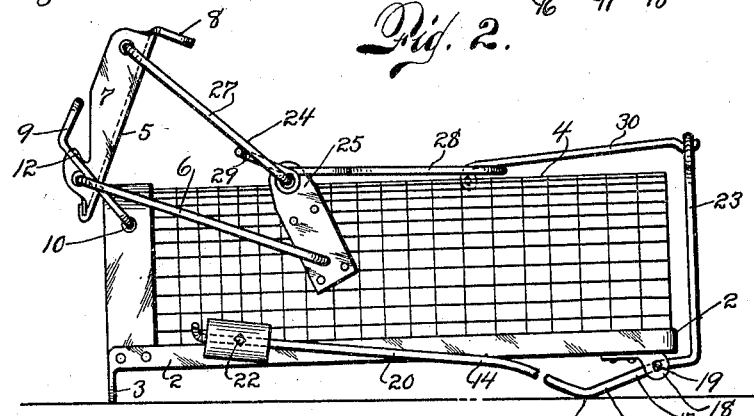
Figure 3:
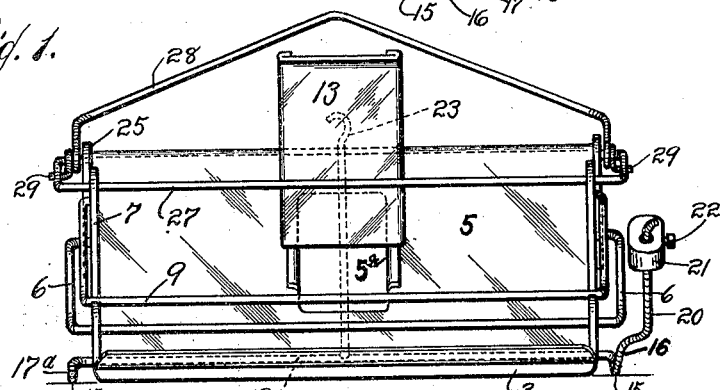
Figure 4:
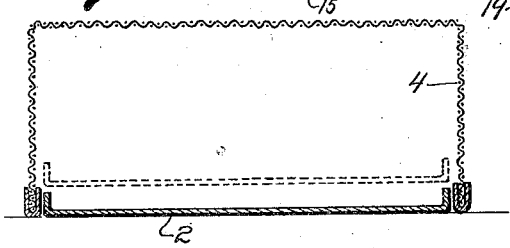

Figure 1 represents a side elevation of the trap in its set condition;

Figure 2, a similar view of the trap after it has been closed by the operation of its weight-actuated mechanism;

Figure 3, a front view of the trap, looking in the direction of the arrow 3, Figure 2, and Figure 4, a transverse section of the trap showing a modification in its construction.

Referring more specifically to the drawings the reference character 2 designates a platform which at its front end has a downwardly projecting flange 3 for its tiltable support upon a lever of the operating mechanism hereinafter to be described.

In the construction shown in Figures 1 to 3 of the drawings, the platform forms the bottom of a cage 4 which is fastened at the edges thereof. The cage which is made of screening or other perforated material in its entirety or in part, is open at the front end of the platform, and its opening is normally closed by an upwardly swinging gate 5 which is pivoted at the side of the cage through the medium of parallel arms 6.

The gate consists of a plate having forwardly extending flanges 7 at its ends and an oppositely projecting flange 8 at its upper edge which in the operation serves as a stop to limit the downward movement of the gate by engagement with the roof of the cage. A latch 9 consisting of a U-shaped bar pivoted to the sides of the cage, as at 10, is adapted to engage with notches 12 in the end flanges of the door to secure it in its closed position.

The gate 5 has an opening $5^a$ normally closed by a sliding door 13 which serves to release a number of animals one at a time after they have been caught in the cage.

In the operation of the trap the platform is at its end opposite to that at which the animals enter the cage, supported upon a lever 14 which is fulcrumed as at 15 by engagement with a surface upon which the trap is placed, through the medium of a downwardly bent crook 16.

The lever which extends at a side of the cage is at the end of its short arm 17 pivoted in lugs 18 below the platform through the medium of a transversely extending shaft 19 which at the opposite side of the cage has an arm $17^a$ bent in parallel relation to the other and which likewise engages with the surface upon which the trap is supported. The long arm 20 of the lever carries a weight 21 which is slidably adjustable and which may be secured in a selected position by a set screw 21 or other suitable means. An upwardly extending rod 23 on the arm, hook-shaped at its upper end, provides a trigger for the actuation of the gate-releasing mechanism, the construction of which will now be described.

A rocker-lever 24 fulcrumed in bearing lugs 25 at the sides of the cage is composed of two hingedly connected members 27 and 28 which are arranged for cooperation by short arms of one engaging at the under side of the other.

The member 27 of the rocker lever is composed of a U-shaped rod loosely extending through apertures in the flanges 7 of the gate and having its ends bent inwardly for its pivotal connection with the apertured bearing lugs at the sides of the cage. The other member 28 of the lever is shaped to form a bail which in practise is engaged by a catch 30 of the releasing mechanism, its arms are looped for its pivotal connection with the inwardly bent end portions of the other member and the arms are bent outwardly at their extremities to engage with the under side of the parallel parts of said member.

The object of composing the rocker lever of two relatively movable members is to permit of its being folded flat upon the roof of the cage for convenience in packing and transportation.

The hereinbefore mentioned catch 30 is pivoted on the roof of the cage and provides the connecting medium between the rocker lever of the gate and the trigger 23 on the lever 14, as will hereinafter be explained.

In the modification of the invention illustrated in Figure 4, the cage is made separate from the tilting platform and the latter moves independently thereof.

In this construction the cage is supported on the floor or other surface on which the trap is placed and does not move in the operation while the platform rests upon the lever as before and is separately tilted by the weight of the animals.

In the operation of my invention the trap is set by lifting the latch to release the upwardly swinging gate, raising the gate to the position in which it uncovers the entrance to the cage, through the medium of the rocker-lever, and securing the latter in its adjusted position by passing the catch through its bail-shaped member and engaging the extremity of the same under the hook-shaped end of the trigger.

With the parts thus arranged, the rear end of the platform is raised above the surface upon which the trap is placed, by the lever which is fulcrumed upon said surface by engagement of the crooks between its oppositely extending arms.

The counterpoise on the single long arm of the lever is adjusted according to the number of animals it is desired to entrap at one time, it being understood that if the poise is disposed adjacent the fulcrum of the lever the weight of one animal will be sufficient to tilt the platform, while when it is further removed therefrom it requires the aggregate weight of several of the animals to actuate the mechanism which releases the gate of the cage.

After the trap has been set in the manner hereinbefore explained, a bait is placed on the platform and the animals attracted thereby enter the cage through the opening at its front and by their weight cause the levers to move about its fulcrum against the restraining influence of the counterpoise on the long arm of the same.

The animals are thus permitted to enter the cage one after another until their aggregate weight overbalances the counterpoise, when by the downward movement of the rear end of the platform and the consequent movement of the lever 14 about its fulcrum, the trigger is released from the catch and the gate falls to its closed position.

After the gate is closed, the latch automatically reassumes its position in engagement with the notches in the flanges thereof and thereby secures the gate against being opened either through action of the animals in the cage or by accident in removing the trap to the place at which the animals are released by raising the door 13 which normally closes the opening of the gate.

It will be apparent that the trap is particularly adapted for use in catching mice and rats and that variations in details of construction and the arrangement of the parts of its operating mechanism may be resorted to within the scope of the invention.

What I claim and desire to secure by Letters-Patent is:

1. An animal trap comprising a lever, a tiltable platform supported at one end on an arm of the lever, a counterpoise on the other arm of the lever, a cage above the platform, having an entrance, a gate adapted to close said entrance, and mechanism to hold the gate in an open position and to allow of closing movement of the same, including a trigger-member operated by movement of the lever.

2. An animal trap comprising a lever, a tiltable platform supported at one end on an arm of the lever, in pivotal connection therewith, a counterpoise on the other arm of the lever, a cage above the platform, having an entrance, a gate adapted to close said entrance, and mechanism to hold the gate in an open position and to allow of closing movement of the same, including a trigger-member operated by movement of the lever.

3. An animal trap comprising a lever, a tiltable platform supported at one end on an arm of the lever, a counterpoise adjustably carried on the other arm of the lever, a cage above the platform, having an entrance, a gate adapted to close said entrance, and mechanism to hold the gate in an open position and to allow of closing movement of the same, including a trigger-member operated by movement of the lever.

4. An animal trap comprising a lever, adapted to be fulcrumed by engagement with a surface upon which the trap is placed, a tiltable platform supported at one end on an arm of the lever, a counterpoise on the other arm of the lever, a cage above the platform, having an entrance, a gate adapted to close said entrance, and mechanism to hold the gate in an open position and to allow of closing movement of the same, including a trigger-member operated by movement of the lever.

5. An animal trap comprising a lever having a downwardly bent crook which provides its fulcrum by engagement with a surface upon which the trap is placed, and arms extending oppositely therefrom, a tiltable platform supported at one end on an arm of the lever, a counterpoise on the other arm of the lever, a cage above the platform, having an entrance, a gate adapted to close said entrance, and mechanism to hold the gate in open position and to allow of closing movement of the same, including a trigger-member operated by movement of the lever.

6. An animal trap comprising a lever having a downwardly bent crook which provides its fulcrum by engagement with a surface upon which the trap is placed, and arms extending oppositely therefrom, one of said arms including two members connected by a rod, to engage with the surface at two points, a tiltable platform supported on the doubled arm of the lever in pivotal connection with the rod, a counterpoise on the other arm of the lever, a cage above the platform, having an entrance, a gate adapted to close said entrance, and mechanism to hold the gate in an open position and to allow of closing movement of the same, including a trigger-member operated by movement of the lever.

7. An animal trap comprising a lever, a tiltable platform supported at one end on an arm of the lever, a counterpoise on the other arm of the lever, a cage above the platform, having an entrance, a gate adapted to close said entrance, and mechanism to hold the gate in an open position and to allow of closing movement of the same, including a rocker-lever connected with the gate, a catch loosely engaging with an arm of the rocker lever, and a trigger on the supporting lever, engaging with the catch.

8. An animal trap comprising a lever, a tiltable platform supported at one end on an arm of the lever, a counterpoise on the other arm of the lever, a cage above the platform, having an entrance, a gate adapted to close said entrance, and mechanism to hold the gate in an open position and to allow of closing movement of the same, including a rocker-lever connected with the gate and composed of foldably connected members, a catch loosely engaging with an arm of the rocker lever, and a trigger on the supporting lever, engaging with the catch.

In testimony whereof I have affixed my signature.

JOHN A. HEDBERG.